(No Model.) 2 Sheets—Sheet 1.
E. TUSH.
HAY RAKE.
No. 438,565. Patented Oct. 14, 1890.
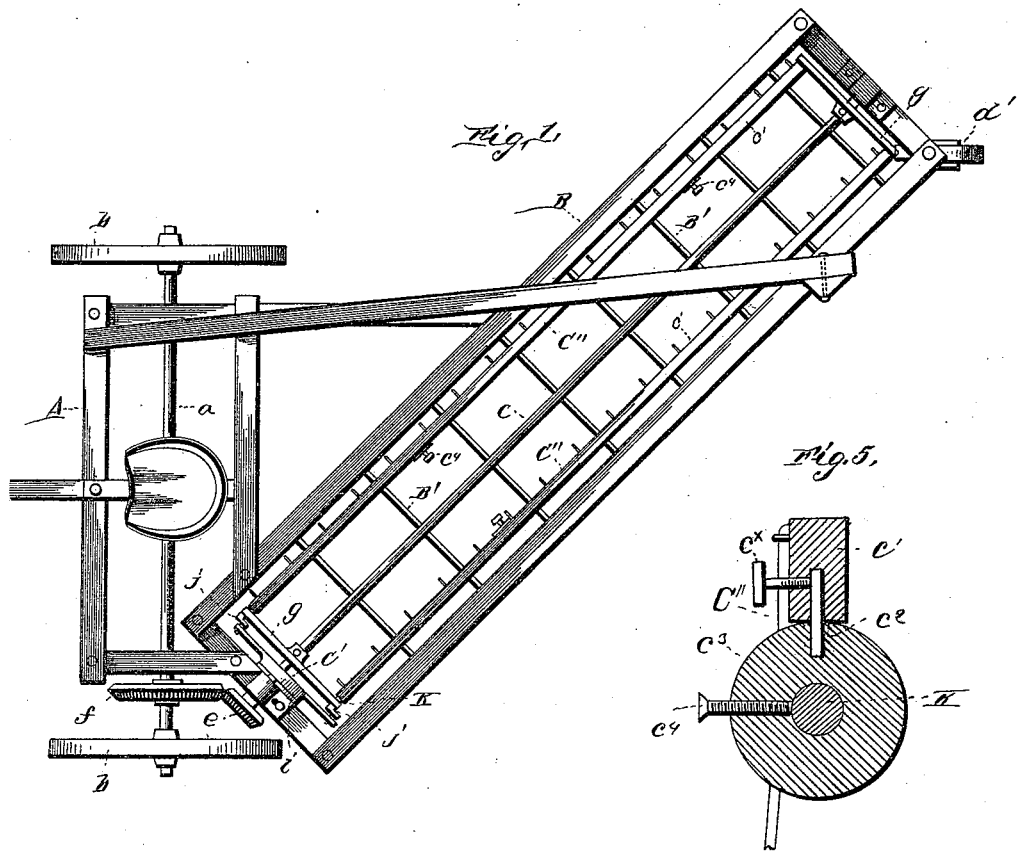
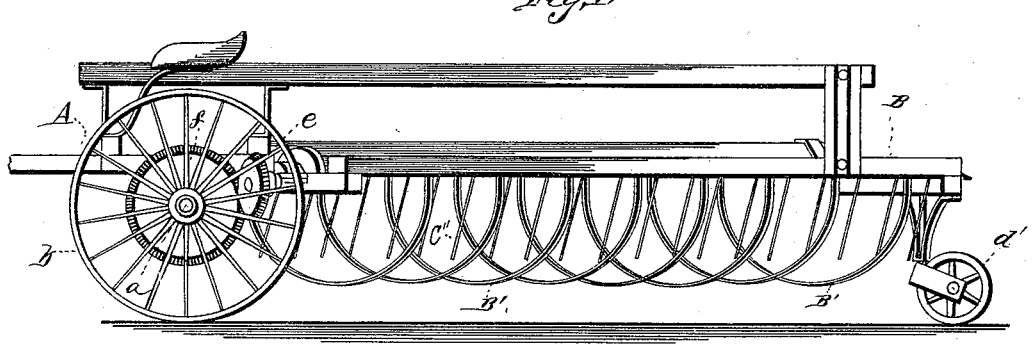
Witnesses
Chas. L. Taylor
Philip L. Masi
Inventor
Elwood Tush
By his Attorney
E. W. Anderson (No Model.) 2 Sheets—Sheet 2.
E. TUSH.
HAY RAKE.
No. 438,565. Patented Oct. 14, 1890.
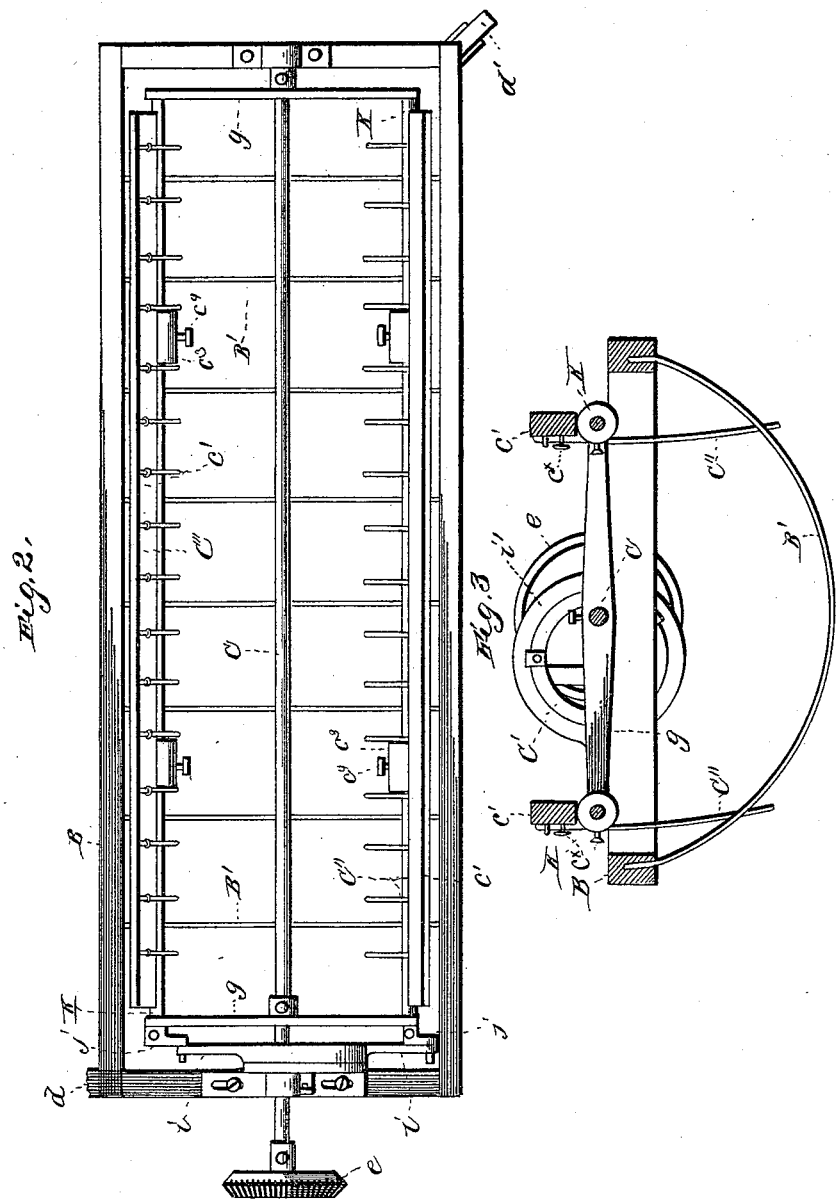
WITNESSES:
INVENTOR
Elwood Tush
BY
E.W. Anderson
his ATTORNEY.

United States Patent Office.

ELWOOD TUSH, OF MANCHESTER, IOWA.

HAY-RAKE.

SPECIFICATION forming part of Letters Patent No. 438,565, dated October 14, 1890.

Application filed January 16, 1890. Serial No. 337,057. (No model.)

*To all whom it may concern:*

Be it known that I, ELWOOD TUSH, a citizen of the United States, and a resident of Manchester, in the county of Delaware and State of Iowa, have invented certain new and useful Improvements in Side-Delivery Hay-Rakes; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a top plan view. Fig. 2 is a top plan view of the rake and frame in detail, and Fig. 3 is a cross-section of same. Fig. 4 is a side view, and Fig. 5 is a detail section.

This invention relates to certain improvements in horse hay-rakes in general, and more especially that class termed "side delivery" or in which the hay or grain is raked at an angle to the line of draft and delivered at one side of the machine; and it consists of the novel combination and construction of parts, as will fully appear from the following description and accompanying drawings.

In accordance with my invention I employ the usual running-gear, comprising the frame A, its carrying axle $a$, wheels $b$, and the pole $c$.

B is a guard-carrying frame, which is arranged or secured at an angle—say about forty to sixty degrees to the frame A—which is upheld and borne at its distant end by a caster-wheel $d'$. This frame has fixed to it a series of wire bow-shaped or semicircular guards B', their ends being secured to the lower surface of the side bars of said frame and their convexities presented downward.

Upon the frame B is journaled a shaft C, extending lengthwise thereof and geared at one end by a bevel-pinion $e$ to a large bevel-gear $f$ on the shaft $a$ of the wheels $b$ for rotating said shaft. This shaft carries near its ends, inside of the frame B, two fixed bars $g$ $g$, while to the inner side of one of the end bars of the frame B is secured an eccentric C'. Encompassing this eccentric is the ring or circular portion $i'$, of a pitman or yoke $i$, in the ends of which are pivoted the outer ends or arms of cranks $j$, which receive and have connected to them by set-screws the reduced ends of bars or rods K, passing through apertures in one of the bars $g$ at its ends.

C'' C'' are the rakes, whose heads $c'$ are adjustably or removably connected by holding-screws $c^x$ to studs or arms $c^2$, fixed in or to sleeves $c^3$, held on the bars or rods K by set or holding screws $c^4$, and whose teeth stand within the plane of the guard-frame. This arrangement provides for the connection of the rake-heads above the carrying-rods K, whereby they can be readily secured in position or removed when requiring renewal. The eccentric C', acting through the yokes $i$, the cranks $j$, and the bars K, keep the rake-teeth constantly in a substantially vertical position. It will therefore be seen that as the shaft is rotated, which of course will take place as the machine is put in motion, the rakes will be carried around and act upon the grain or hay previously cut at an angle to the line of draft, and deliver it at one side of the machine in the form of "windrows" for removal, as desired, and that after the rakes have disposed of their contents they ascend with their teeth in a vertical position while being carried rearward by the rotation of the shaft, and when reaching their forward position again drop with their teeth into position for service.

The guards B', it will be seen, serve to prevent the grain or hay from being blown away when lifted by the rake-teeth, while they also serve to guide the grain or hay in its delivery to the side of the machine into windrows, as above stated, the rake-teeth passing between said guards in acting upon the grain or hay.

Having thus fully described my invention, what I claim, and desire to secure by Letters Patent, is—

In a horse hay-rake, the combination of the frame arranged at an angle to the line of draft and having secured to its under side bow-shaped guards and carrying a shaft geared to the running-gear, the eccentric secured to one end of said frame, the yoke or pitman encircling said eccentric and having opposite arms, the rods carrying at their inner ends cranks bearing in cross-bars secured to said shaft, and engaging said arms of said yoke or pitman, and the rakes having their heads detachably connected to and arranged above collars secured upon said rod, substantially as set forth.

In testimony whereof I affix my signature in presence of two witnesses.

ELWOOD TUSH.

Witnesses:
F. O. STANGER,
F. B. BLAIR.